June 2, 1931. J. MORRISON 1,808,058
WINDSHIELD
Filed Dec. 14, 1929
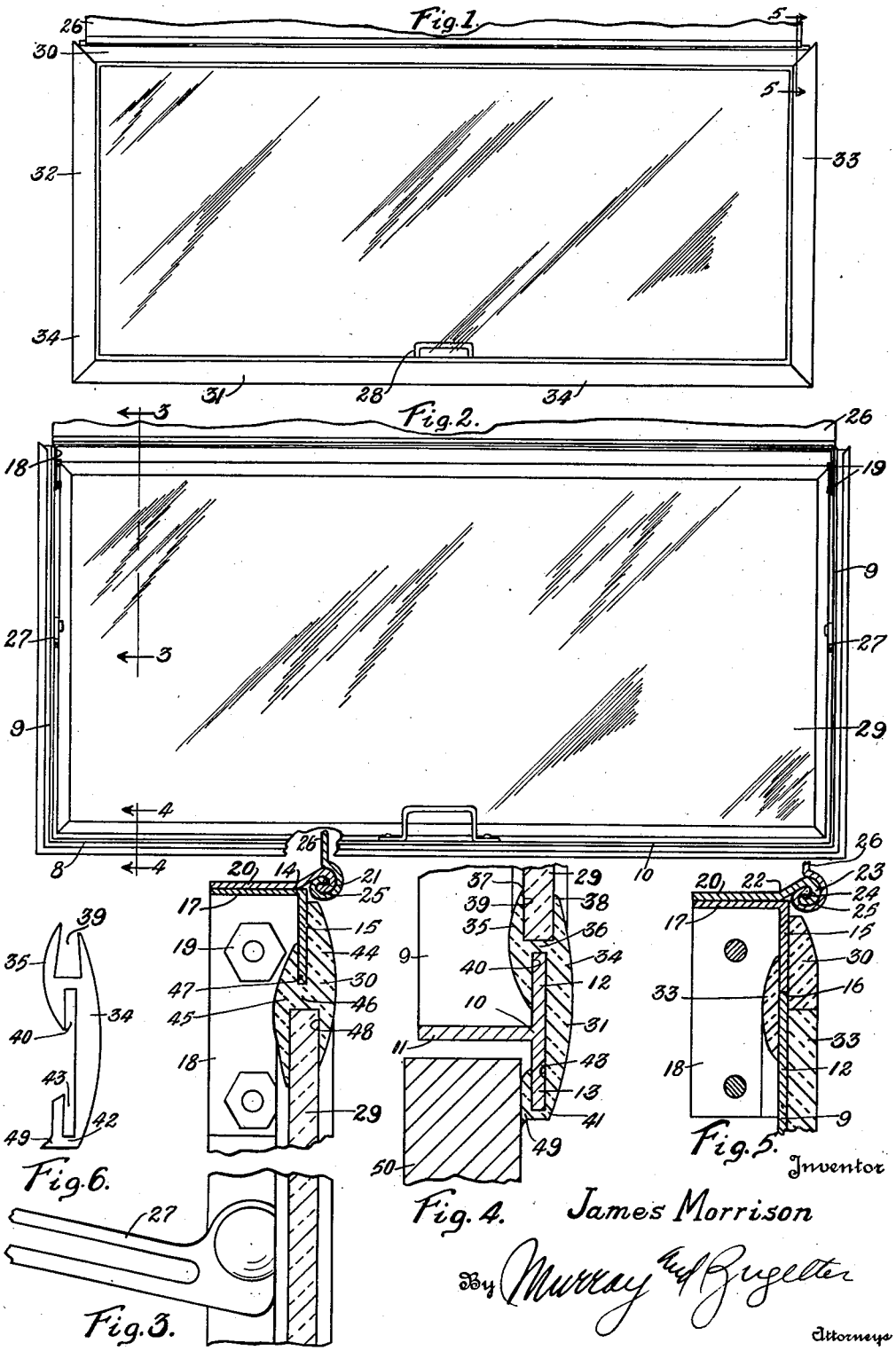

Patented June 2, 1931

1,808,058

UNITED STATES PATENT OFFICE

JAMES MORRISON, OF CINCINNATI, OHIO, ASSIGNOR TO THE HIGHLAND BODY MANUFACTURING COMPANY, OF ELMWOOD, OHIO, A CORPORATION OF OHIO

WINDSHIELD

Application filed December 14, 1929. Serial No. 414,068.

This invention relates to a windshield, particularly for automobiles, and has for its object the provision of a windshield protected against injury by non-rigid retaining means completely insulating the glass portion of the shield from contact with adjacent rigid members.

The device of this invention concerns itself especially with windshields of the one-piece type. These usually consist of a glass plate having a border of metal, wood, or other rigid material attached directly to the edges of the glass. There are disadvantages common to shields of this type. Chief of these is the fact that torsion and shocks to which the vehicle is subjected are transmitted directly by the non-yielding windshield frame to the glass itself, resulting frequently in cracking or shattering of the glass. An additional disadvantage is rattling of the windshield after a period of use has somewhat loosened the parts of the border. Disadvantages of this kind are overcome by the means of this invention which provide a windshield in which the glass plate is held in position within a rigid frame by border strips of rubber or the like, each strip providing separate channels in one of which an edge of the glass plate is held, and the other of which receive flange portions on the rigid frame, whereby the glass is retained in place, its edges encased completely in rubber and having no contact either with rigid members or with the usual metallic retaining means such as clamps or bolts. The elimination of screw and bolt holes in the rigid frame assures maximum strength of this member.

With reference to the drawings, illustrating the invention:

Fig. 1 is a front elevational view of a windshield of this invention;

Fig. 2 is a rear elevational view of the same;

Fig. 3 is an enlarged view taken on line 3—3 of Fig. 2;

Fig. 4 is an enlarged view taken on line 4—4 of Fig. 2 and illustrating the weather proof relationship of the rubber strips with the body of a vehicle;

Fig. 5 is an enlarged view taken on line 5—5 of Fig. 1.

Fig. 6 is an end view of one of the resilient strips forming a part of this invention.

The windshield comprises the rectangular rigid frame 8 of which the sides 9, and bottom 10 preferably consist of T strips having portion 11, extending rearwardly of the frame, and the inner and outer flanges, 12 and 13 respectively, disposed at right angles therewith. The top strip 14 of frame 8 consists of an angle member, the vertical portion 15 of which has each end disposed upon an offset 16 cut in the inner flanges 12 of sides 9. The horizontal portion 17 of top strip 14 has its ends 18 turned downwardly and bolted as at 19 to the inner faces of portions 11 of the sides 9. A ribbon strip 20 is secured to the upper face of portion 17 of top strip 14, its front edge extending outwardly of the front of the frame. Edge 21 is turned upwardly as at 22 and further bent inwardly and downwardly upon itself as at 23 to provide the restricted channel 24. Channel 24 is adapted to receive the inwardly-turned edge 25 of a suitable mounting member 26 secured to the vehicle, whereby a hinged mounting for frame 8 is provided. A longitudinally-slotted arm 27 is pivotally secured to each of the portions 11 of sides 9, the slots being adapted to receive threaded studs (not shown) projecting from the body of the vehicle and upon which suitable wing nuts or the like, may be tightened for retaining frame 8 in a desired angularly-disposed position. A handle 28 is secured to the portion 11 of bottom 10 for adjusting the windshield. The windshield glass 29 is held in place within frame 8 by means of four rubber strips, the top strip 30, bottom 31, and side strips 32 and 33. The bottom and side strips are similarly formed and comprise the front section 34 and rear section 35 joined by the rib 36 extending longitudinally of the two sections. Front section 34 is of considerably greater width than rear section 35. Rib 36 joins section 34 adjacent an edge of the latter, and joins section 35 somewhat below the middle thereof. The edge 37 of rear section 35 extends outwardly of the strip beyond the edge 38 of front section 34, for a purpose to be explained. Two channels or recesses 39 and 40 are thus provided, channel 39 being of somewhat greater width than the undercut channel 40. The faces of sections 34 and 35 are convex and the walls are normally inclined toward one another, when free of pressure, so that the walls exert pressure inwardly of their channels and resist spreading whereby a gripping action is secured (See Fig. 6). The lower edge 41 of strips 31, 32 and 33 is formed with a backwardly-extending L section 42, whereby channel 43 is provided. The lower edge of L section 42 is formed with a ridge 49 projecting rearwardly of the strip.

In positioning the resilient strips upon sides 9 and bottom 10, the flange 12 is inserted into channel 40, flange 13 into channel 43, while the larger dovetail channel 39 is adapted to receive an edge of the glass 29. The ends of the rubber strips are cut angularly to provide for a mitered abutment of one with another when in position. Figure 4 illustrates clearly the positioning just described and likewise demonstrates how the ridge 49 contacts the adjacent body portion 50 of the vehicle for providing a weathertight joint around the sides and bottom of the windshield.

The top strip 30 (Fig. 3) comprises the front section 44 and the rear section 45 joined by the rib 46. Rib 46 adjoins section 44 slightly below the middle thereof and adjoins section 45 slightly above the middle thereof so that the top and bottom edges of section 45 are in planes below the like edges of the front section 44. The upper channel 47 thus provided receives the edge of section 15. Channel 48 receives the top edge of glass 29. The top edge of the positioned top strip 30 assumes a near-contacting relationship with the hinged mounting 25. The ends of top strip 30 and the upper ends of side strips 32 and 33 are likewise cut to form miter joints at their points of contact.

By reference to Fig. 1 it will be seen that the outer sections of the rubber strips lie in abutment upon the flat face of the frame member providing the inner and outer flanges 12 and 13, thus presenting a neat appearance and serving to absorb shocks received by the frame. The glass as is obvious from the foregoing explanation, has its four edges in abutment with the rubber ribs or channel-bases 36 and 46 which are disposed directly against the adjacent longitudinal edges of the flanges 12 and strip 15. The inner edges of the rear sections 35 and 45 of the rubber strips project for a slightly greater distance, for example, an eighth of an inch, beyond the adjacent edges of the front sections 34 and 44 to compensate for the backward drive of the wind against the windshield and likewise so that in bad weather any water that might gain entry into the glass-retaining channel of the bottom strip, is prevented from rising over the higher rear edge 37 but rather flows out over the shorter edge 38 of the channel 39. It should be noted that the L section 42 on the side and bottom rubber strips insulates the frame itself against edgewise shocks, so that, by the means of this invention, there is provided a windshield in which both the frame and the glass itself are protected against rattling and breakage, and a windshield structure simple in manufacture and efficient in use. Obviously the present invention may be applied in mounting glass in other frames.

What is claimed is:

1. A windshield comprising a rigid frame having flanges extending inwardly and outwardly of the frame, rubber strips providing channels for receiving and gripping said flanges, said strips likewise providing channels opening inwardly of the frame, and a glass sheet receivable along its edges in said inwardly-opening channels and filling the space within the frame.

2. A windshield comprising a rigid open frame having members substantially T-shaped in cross section and disposed so as to provide a free face portion lying in substantially the same plane as that of the frame and forming the front of the frame, rubber strips attachable to the face portion of the frame, each providing a front section for covering said face portion, opposed channels for enclosing the longitudinal edges of the face portion and a third channel opening inwardly of the frame and having its base disposed directly upon the inner longitudinal edge of the face portion, and a section of glass adapted to close the space within the open frame, its edge portions being receivable in said inwardly-opening channels for retaining the glass in position.

3. A windshield comprising a rigid, rectangular frame having side and bottom members T-shaped in cross section and a top member L-shaped in cross section, the members being so disposed as to provide continuous face portions lying in substantially the same plane and forming the front of the frame, rubber strips attachable to the side and bottom members and providing a front section for covering the front face portions of said members, opposed channels for receiving the longitudinal edges of said face portions and having opposed walls adapted to grip said edges, a rubber top strip for attachment to said top member, the rubber top, side and bottom strips providing channels each having its base disposed against the adjacent edge of the adjacent frame member, said channels opening inwardly of the frame, and a section of glass for closing the space within the open frame, said inwardly-opening channels being adapted to receive and their walls adapted to grip the edge portions of the glass for retaining it in position within the frame.

4. A windshield comprising a rigid frame having resilient strips removably attached to the members thereof and covering the normally exposed portions of the frame, said strips providing channels opening inwardly of the frame, backwardly-projecting ridges extending longitudinally of the strips and adapted to be brought into abutment with the body of the vehicle upon which the windshield is mounted for forming a weather-tight seal, and a section of glass adapted to close the space within the frame, its edges being receivable within said inwardly-opening channels, the walls of said channels being adapted to grip the edges of the glass for retaining the glass in position within the frame.

5. The combination with a frame having flat members in a common plane, of molding for holding a sheet of rigid material in the frame, said molding comprising resilient strips with integral projecting portions on one face, said portions providing on each strip a pair of opposed channels for receiving both longitudinal edges of a frame member and a third channel adapted to open inwardly of the frame for receiving an edge of the rigid sheet.

In testimony whereof, I have hereunto subscribed my name this 10th day of December, 1929.

JAMES MORRISON.